No. 730,793. Patented June 9, 1903.

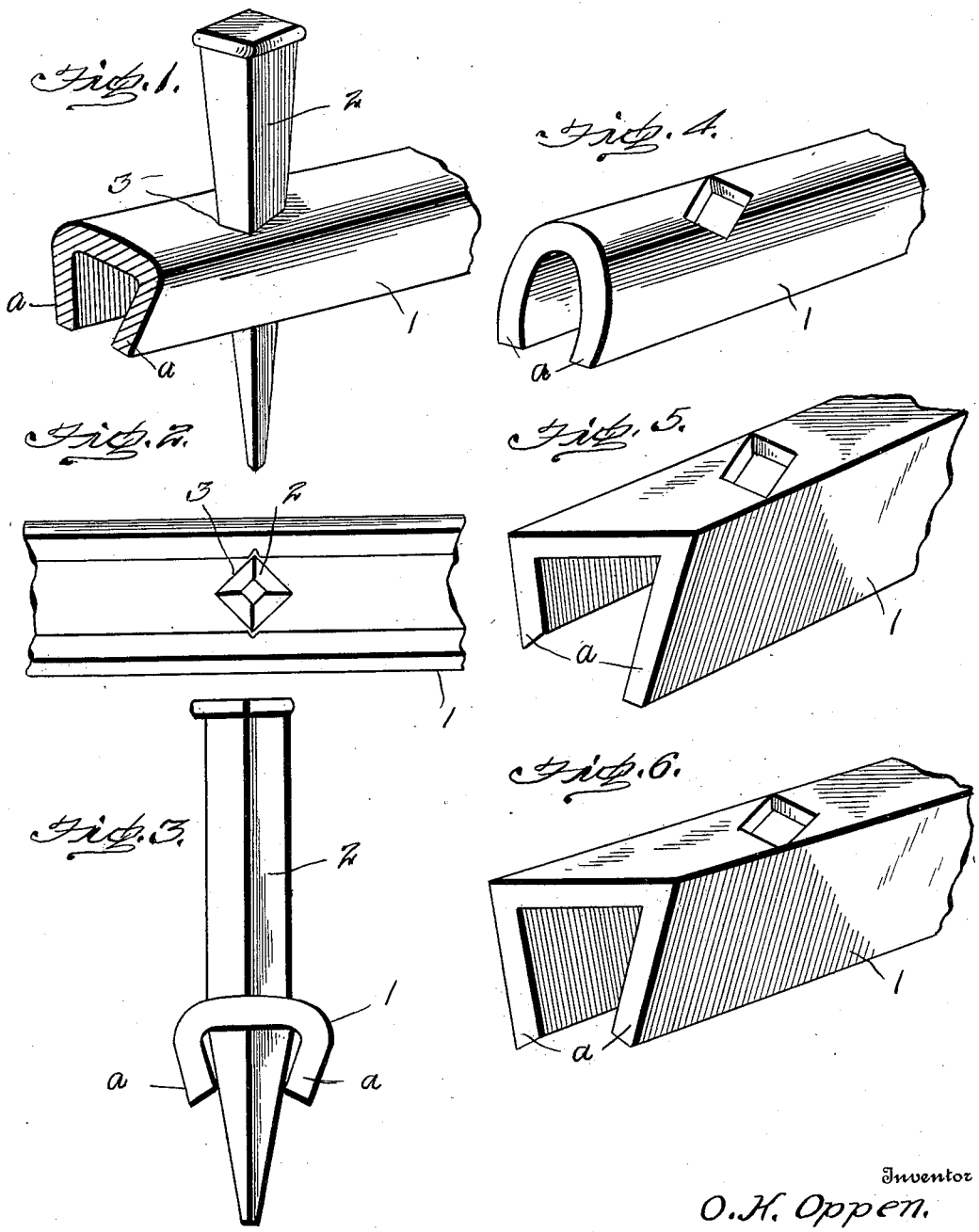

UNITED STATES PATENT OFFICE.

OLE K. OPPEN, OF DECATUR, ILLINOIS, ASSIGNOR TO DECATUR HARROW WORKS, A CORPORATION OF ILLINOIS.

HARROW.

SPECIFICATION forming part of Letters Patent No. 730,793, dated June 9, 1903.

Application filed October 9, 1902. Serial No. 126,615. (No model.)

*To all whom it may concern:*

Be it known that I, OLE K. OPPEN, a citizen of the United States, residing at Decatur, in the county of Macon and State of Illinois, have invented certain new and useful Improvements in Harrows; and I do declare the following to be a full, clear, and exact description of the invention, such as will enable others skilled in the art to which it appertains to make and use the same.

The invention relates to harrows.

The object of the invention is to provide a novel form of harrow-bar whereby the teeth of the harrow when driven into said bar will be automatically and securely locked in position.

With this and other objects in view the invention consists in certain novel features of construction, combination, and arrangement of parts, which will be hereinafter more fully set forth, and particularly defined in the appended claim.

In the accompanying drawings, Figure 1 is a perspective view of a fragment of a harrow-tooth bar illustrating one of the teeth in position. Fig. 2 is a bottom plan view. Fig. 3 is an end view. Fig. 4 is a detail perspective view of a fragment of another form of harrow-tooth bar. Fig. 5 is a similar view of another form of harrow-tooth bar, and Fig. 6 is a view of still another form of harrow-tooth bar.

Referring to the drawings, 1 denotes a harrow-tooth bar made of channeled iron or steel. In Figs. 1, 2, and 3 the bar is of inverted-U form, the sides *a* converging and at their lower edges of less distance apart than the distance through the harrow-tooth 2, whereby when the harrow-tooth is driven through the hole 3, formed in the upper surface of the harrow-tooth bar, the sharp corners of the tooth will engage the lower edges of the harrow-tooth bar and tend to spread them apart and in so doing will form slight notches or creases in the inner faces of the side pieces, which will thus prevent the canting of the teeth sidewise, while the frictional grasp of the side pieces against the corners of the tooth will prevent its accidental withdrawal.

The forms of harrow-tooth bars shown in Figs. 4, 5, and 6 are simply modifications of the present invention. In Fig. 4 the harrow-tooth bar is shown more in the form of an ellipse, while in Fig. 5 one side piece is shown projecting below the other, and in Fig. 6 the side pieces are of equal length. In each of the Figs. 5 and 6 but one of the side pieces is shown diverging. It is not necessary to diverge both side pieces, the result may be secured by diverging but one.

From the foregoing description, taken in connection with the accompanying drawings, the construction, operation, and advantages of my invention will be apparent, it is thought, without requiring a more extended explanation.

Various changes in the form, proportion, and the minor details of construction may be resorted to without departing from the principle or sacrificing any of the advantages of my invention.

Having thus fully described my invention, what I claim, and desire to secure by Letters Patent, is—

The combination with a channeled harrow-tooth bar, one of the side pieces of which extends toward the other, said bar on its upper side being provided with an aperture, of the harrow-tooth inserted in said aperture and engaging the edges of the side pieces of said bar, said tooth being of greater thickness than the normal space between the lower edges of the side pieces of the bar, substantially as set forth.

In testimony whereof I have hereunto set my hand in presence of two subscribing witnesses.

OLE K. OPPEN.

Witnesses:
 VILLA MARY MILLS,
 JOHN L. WADDELL.